United States Patent
Pang et al.

(10) Patent No.: US 7,152,880 B1
(45) Date of Patent: Dec. 26, 2006

(54) GROOVED AIR BAG

(75) Inventors: Hyunsok Pang, Rochester Hills, MI (US); Prabhakar Padiyar, Sterling Heights, MI (US); Jin Ho Jung, Rochester Hills, MI (US); Soonsik Kim, Rochester Hills, MI (US); Robert J. Sadenwater, Clarkston, MI (US); Jeffery S. Coon, Sterling Heights, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 11/252,426

(22) Filed: Oct. 17, 2005

(51) Int. Cl.
*B60R 21/16* (2006.01)
(52) U.S. Cl. .................................. 280/743.2
(58) Field of Classification Search ............. 280/743.1, 280/743.2, 729
See application file for complete search history.

(56) References Cited

U.S. PATENT DOCUMENTS

| | | | |
|---|---|---|---|
| 3,879,057 A * | 4/1975 | Kawashima et al. ..... | 280/743.2 |
| 5,213,361 A * | 5/1993 | Satoh et al. ............. | 280/730.1 |
| 5,997,037 A | 12/1999 | Hill et al. | |
| 6,616,184 B1 | 9/2003 | Fischer | |
| 2003/0218325 A1 | 11/2003 | Hasebe et al. | |
| 2004/0155439 A1 | 8/2004 | Hasebe et al. | |
| 2004/0232681 A1 | 11/2004 | Adomeit | |
| 2005/0110249 A1 | 5/2005 | Hasebe et al. | |
| 2005/0161918 A1 | 7/2005 | Bito | |
| 2005/0212275 A1 | 9/2005 | Hasebe | |
| 2006/0028009 A1 | 2/2006 | Hasebe et al. | |
| 2006/0043707 A1 | 3/2006 | Hasebe et al. | |
| 2006/0066089 A1 | 3/2006 | Hasebe et al. | |
| 2006/0186656 A1 * | 8/2006 | Kumagai ................. | 280/743.2 |

FOREIGN PATENT DOCUMENTS

| | | | |
|---|---|---|---|
| JP | 04292239 | | 10/1991 |
| JP | 10071911 A | * | 3/1998 |
| JP | 11005505 A | | 1/1999 |
| JP | 11321506 A | * | 11/1999 |
| JP | 20011233157 A | | 8/2001 |
| JP | 2005088686 A | | 4/2005 |
| JP | 2005162195 A | | 6/2005 |
| JP | 2005247118 A | | 9/2005 |
| JP | 2005280470 A | | 10/2005 |

* cited by examiner

*Primary Examiner*—Faye M. Fleming
(74) *Attorney, Agent, or Firm*—Markell Seitzman

(57) ABSTRACT

An air bag (100) having a main panel (102) having face panel portion (103) configured to face an occupant when the air bag is inflated, the main panel in the vicinity of the face panel portion including an opening (130, 130a, 130b), the opening having an edge (140). A cup-shaped structure (149,150,152,160) of material is fitted within the opening and sewn or secured to the edge (140) of the main panel opening (130); the cup-shaped structure is located within the air bag below the exterior surface of the main panel. A tether anchored at one end and having a second end secured to a portion of the cup-shaped structure, the length of the tether configured to prevent the cup-shaped structure from moving beyond the exterior surface of the main panel, the cup-shaped structure and remaining parts of the air bag forming opposing lobes (112a, 112b) upon inflation, wherein the cup-shaped structure forms a groove or depression (110) between the lobes.

5 Claims, 5 Drawing Sheets

GROOVED AIR BAG

BACKGROUND AND SUMMARY OF THE INVENTION

The present invention generally relates to passenger side air bags.

FIG. 1 illustrates a top view showing a deployed conventional passenger side air bag 20 in relation to an occupant 22 seated on a seat 24. The seat back 26 is the only portion of the seat shown. Air bag 20 is inflated by an air bag inflator 28. Air bag 20 typically comprises a single inflatable chamber 30 inflated by gas from inflator 28. The face portion or panel 32 of the air bag impacts the occupant's chest, shoulders and head. As can be appreciated, as the occupant's seated position at the time of air bag inflation deviates from the normal seated position by taking a position closer to the vehicle's instrument panel, the velocity at which the air bag impacts the occupant increases. As can be appreciated, if the occupant's body is on or near the cover of the air bag module at the time of inflation, the air bag/occupant interaction is elevated.

It has been proposed that an air bag, such as 20a, be formed with spaced-apart lobes 34a and 34b, separated by a groove or space 36. When this air bag 20a is inflated, it will take the shape as shown in FIG. 2 in which the space or groove 36 is positioned in front of the normally seated occupant, thereby avoiding contact with the occupant's head. The air bag-occupant loading is primarily between the lateral lobes 34a and 34b in relation to the right and left sides of the occupant's torso and the right and left shoulders of the occupant, and impact is lessened if the occupant is out of position at the beginning of air bag inflation.

It is an object of the present invention to provide an air bag that minimizes the interference between the air bag and an out-of-position or normally seated occupant. Due to the inflated configuration of the air bag, during initial deployment, the air bag or cushion deploys along the left and right sides of the occupant. The spreading-out of the cushion significantly reduces interaction with the occupant that is seated close to the air bag module (in relation to its undeployed or stowed state).

It is a further object of the present invention is to provide head protection against a windshield in unbelted conditions.

Accordingly the invention comprises: an air bag having a main panel having face panel portion configured to face an occupant when the air bag is inflated, the main panel in the vicinity of the face panel portion including an opening, the opening having an edge. A concave or cup-shaped structure of material is fitted within the opening and sewn or secured to the edge of the main panel opening; the cup-shaped structure is located within the air bag below the exterior surface of the main panel. A tether is anchored at one end and has a second end secured to a portion of the cup-shaped structure. The length of the tether is configured to prevent the cup-shaped structure from moving beyond the exterior surface of the main panel. The cup-shaped structure, in cooperation with the tether and remaining parts of the air bag, form opposing lobes upon inflation, wherein the cup-shaped structure forms a groove or depression between the lobes.

More particularly, the invention includes an air bag 100 comprising: a main (face) panel 102 having an upper neck portion 124, a lower neck portion 124 and cushion portion 126. The main panel also has: a left edge 134 and a right edge 134a. This air bag also includes a left outside panel 104a having a neck portion 120 and cushion portion 122 secured along the left edge of the main panel and a right outside panel 104b having a neck portion 120 and cushion 122 similarly secured along the right outside edge of the main panel. Part of the cushion portion of the main panel 102 has a face panel portion that is proximate to and configured to interact with an occupant 22 to be protected. The face panel portion has an opening 130 therein; the opening has one or more edges 140a–d.

A combination of additional pieces of air bag material form a recess means which is secured about the edge(s) of the opening in the face panel portion of the cushion portion of the main panel. The recess means is configured to form an inwardly extending recess or pocket 110 in the face panel. The recess means has a left recess (or groove) panel portion 150 secured to a left portion of the edge 140d of the face panel opening 130, and a right recess panel portion 152 secured to the right portion 140c of the edge of the face panel portion. The recess means further includes a center recess panel portion 160 secured to each of the right and left recess panel portions and to the main panel. A tether is secured to the central portion of the recess means, for limiting outward movement of the central portion of the recess means to cause the air bag, when inflated, to have an inflatable first lobe 112a formed by one side of the recess means and by an inflatable second lobe 112b on another side of the recess means and the face panel. The opening in the face panel can take various shapes including rectangular, oval and a hybrid shape including a top portion that is rectangular and a lower portion that is triangular.

Many other objects and purposes of the invention will be clear from the following detailed description of the drawings.

DETAILED DESCRIPTION OF THE DRAWINGS

Figure 1:
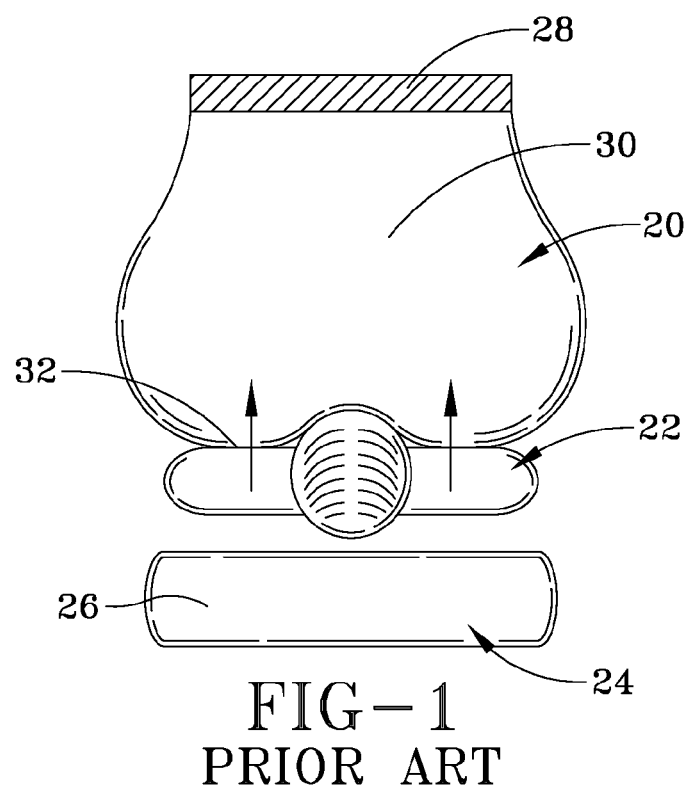
FIG. 1 illustrates a top view of one type of prior art passenger air bag.
Figure 2:
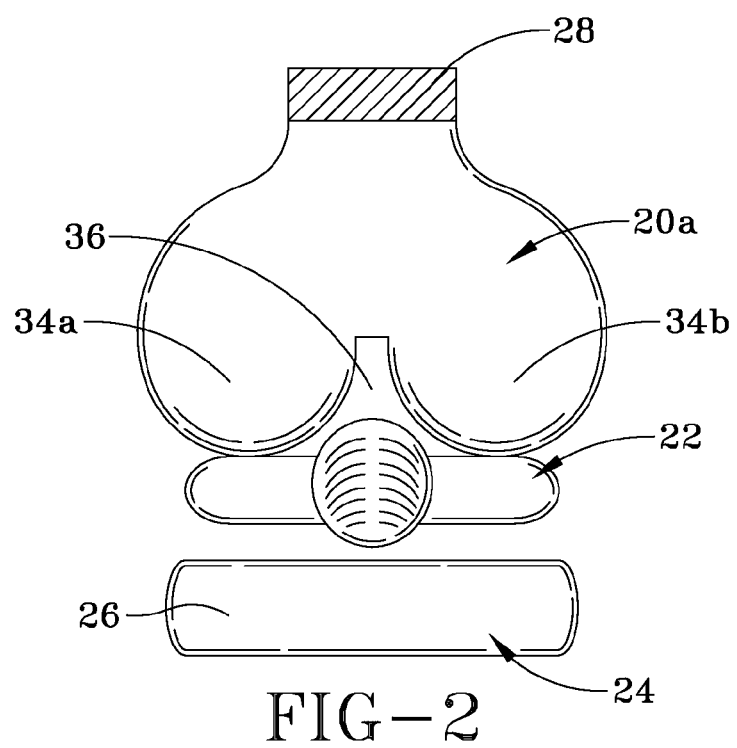
FIG. 2 is a top view showing the mode of operation of a newly proposed type of air bag, also in the prior art.

Air bag 100 shown in FIGS. 3, 3a, 4 and 5 includes a main panel 102 having a face panel portion 103, which faces the occupant to be protected, and a plurality of side panels 104a and 104b. Each of the above panels is made typically from woven air bag material comprising nylon or polyester. Each of the side panels 104a and 104b is substantially identical and the mirror image of the other. Each of the side panels 104a and 104b includes a neck portion 120 and a cushion portion 122. The main panel also includes a plurality of opposing neck portions 124 and a cushion portion 126; the face panel portion mentioned above is part of the cushion portion 126. The cushion portion, in the vicinity of the face panel portion 103 includes an opening 130, which as seen below is used to form a recess in the inflated air bag 100. The air bag is formed by sewing edge 132 of side panel 104a to edge 134 of face panel 103. Similarly edge 132a is sewn to edge 134a in a known manner providing an air bag 100 with its general shape. Upon attachment of the various panels an inflator (not shown) is positioned within the neck of the air bag. Prior to inflation the air bag is folded and stored in a housing 306 of an air bag module 300 of which air bag 100 is a part. An inflator 306 in the housing inflates the air bag.

Figure 6A:
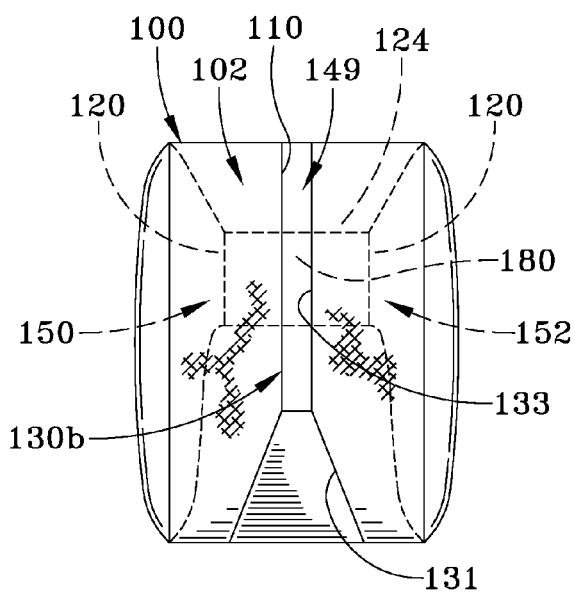
FIG. 6a shows another alternative of the invention.
Figure 8:
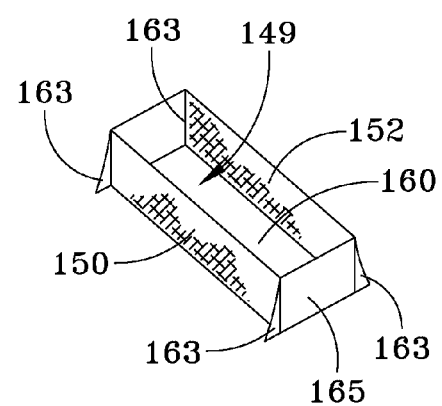
FIG. 8 shows still another alternative of the invention.
Figure 6:
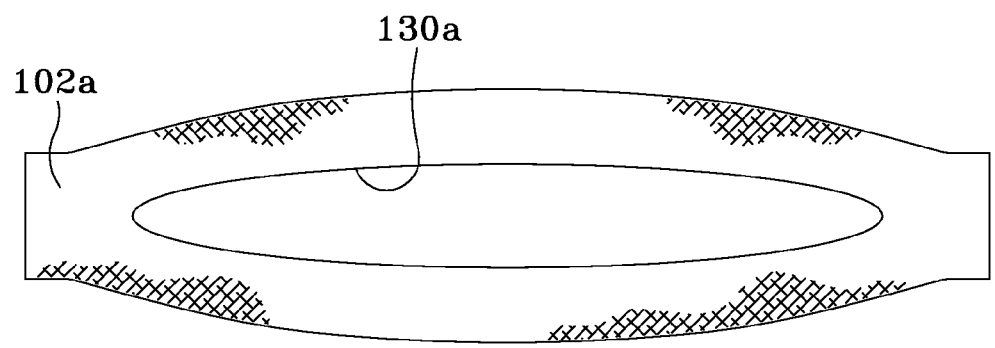
FIG. 6 shows an alternative of the invention.

Opening 130 includes one or more edges 140a, 140b, 140c and 140d. Even though opening 130 is shown as rectangular in shape, the opening 130 can also be oblong (see FIG. 6, which shows an alternate face panel 102a with an oval opening 130a). The opening 130b in the face panel portion can be a hybrid shape, for example a combination of trapezoidal (or triangular) 131 and rectangular 131a in shape, as shown in FIG. 6a, to minimize interference with a child or small adult in an out-of-position (OOP) seating position with their head or chest on or very close to the cover of the air bag module.

The air bag 100 includes a concavely shaped or cup-shaped structure 149 (150, 152, 160) of material fitted within the opening 130 and sewn or otherwise secured to the edge 140 of the main panel opening 130. The cup-shaped structure 149 is located within the air bag below the exterior surface of the main panel and is used, in cooperation with a tether and other panels of material, to create a groove or recess 110 between opposing lobes 112a and 112b. This cup-shaped structure 149 is formed by providing a shaped, single panel or by sewing one or more panels of material to the edge(s) generally denoted by numeral 140 of opening 130.

Figure 4:
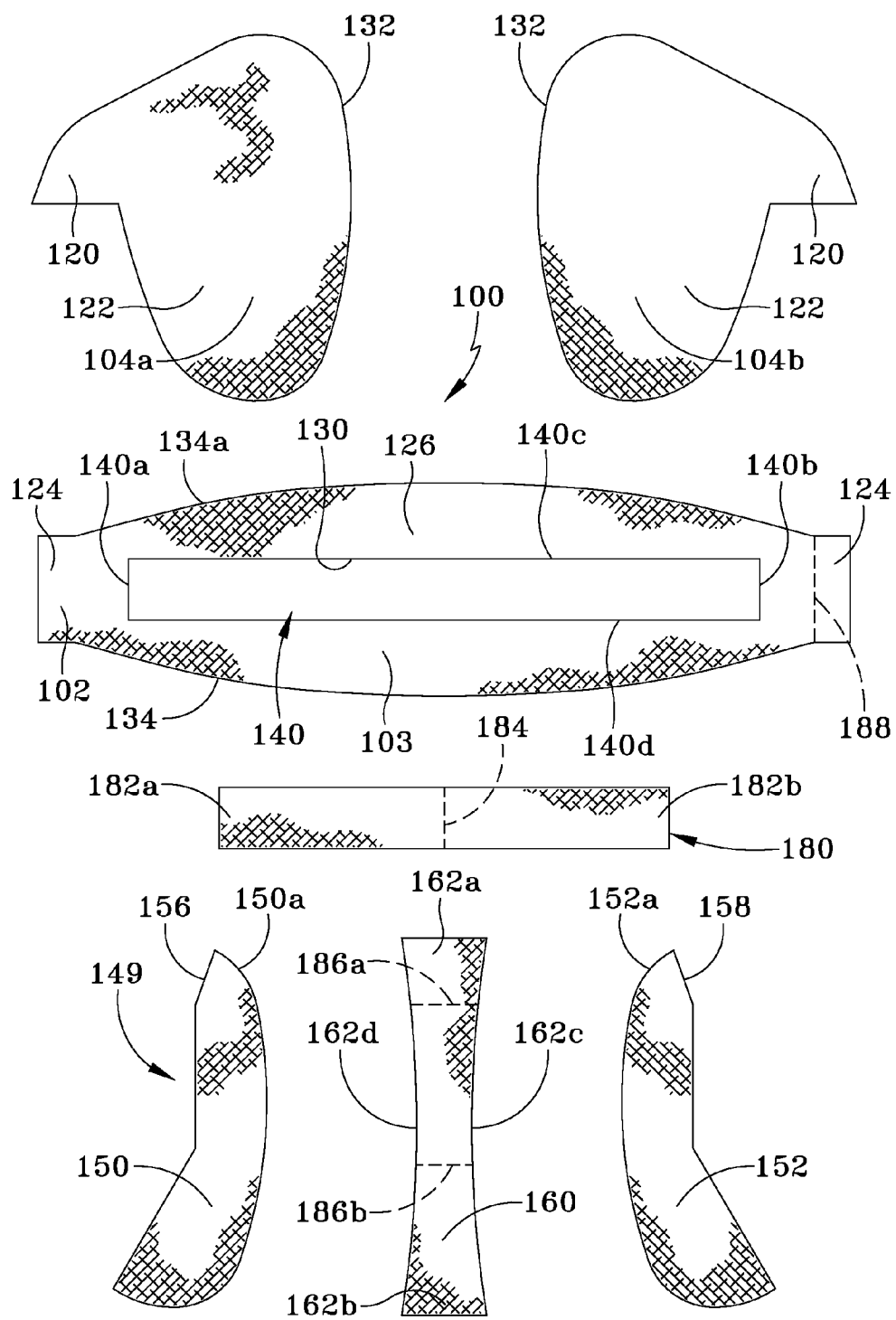
FIG. 4 is an exploded view of the present invention illustrating the various panels of material comprising the air bag shown in FIG. 3.

In the embodiment illustrated in FIG. 4, air bag 100 includes a left grooved panel 150 and a right grooved panel 152. Edge 150a of panel 150 is sewn to edge 140d while edge 152a is sewn to edge 140c of main panel 102. Each of the left grooved panel 150 and right grooved panel 152 further includes a respective side edge 156 and 158 opposite edges 150a and 152a. As can be appreciated, when the side panels 150 and 152 are sewn to the opening of the main panel 102, they begin to provide depth to the opening 130 (as well as to openings 130a and 130b). Air bag 100 further includes a center groove panel 160 having edges 162a, 162b, 162c and 162d. In general the center groove panel will follow the shape of the opening 130, 130a or 130b. Edge 162d is sewn to edge 156 of panel 150, while edge 162c is sewn to edge 158 of panel 152. Further, edge 162a is sewn to edge 140a and edge 162b is sewn to edge 140b of opening 130. As can be seen the panels 150, 152 and 160 form the cup-shaped or concave structure. Further, the concave shape of structure 149 can be formed, for example, by creating pleats 163 properly positioned about a flat piece of material 165.

As can be appreciated, if the cup-shaped structure 149 including the three groove panels 150, 152 and 160, after being sewn to the main panel 102, is pushed rearward through opening 130, a recessed structure, that is, recess 110 is formed. However, as can be appreciated, if the motion of one or more of the panels 150, 152 and/or 160 is not restrained as the air bag inflates, this concave structure 149, upon inflation of the air bag, will balloon outwardly in front of the face panel. To prevent this ballooning, the air bag 100 further includes one or more tethers or tether panels generally shown as 180. FIG. 4 illustrates one tether panel. Tether panel 180 includes edge 182a, edge 182b and an intermediate point 184. The tether 180 can be secured to a portion of module 300 such as housing 306.

Figure 3:
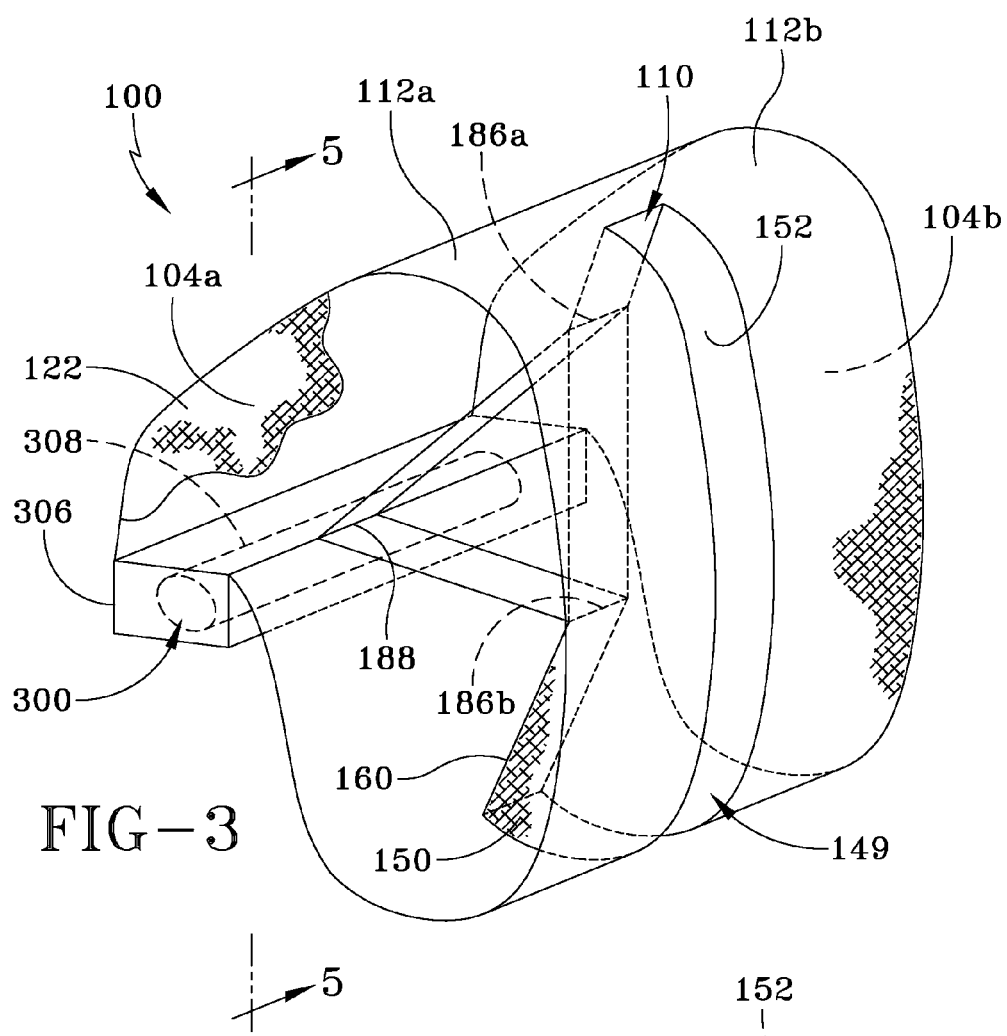
FIG. 3 is a diagrammatic view of an inflated air bag incorporating the present invention.
Figure 5:
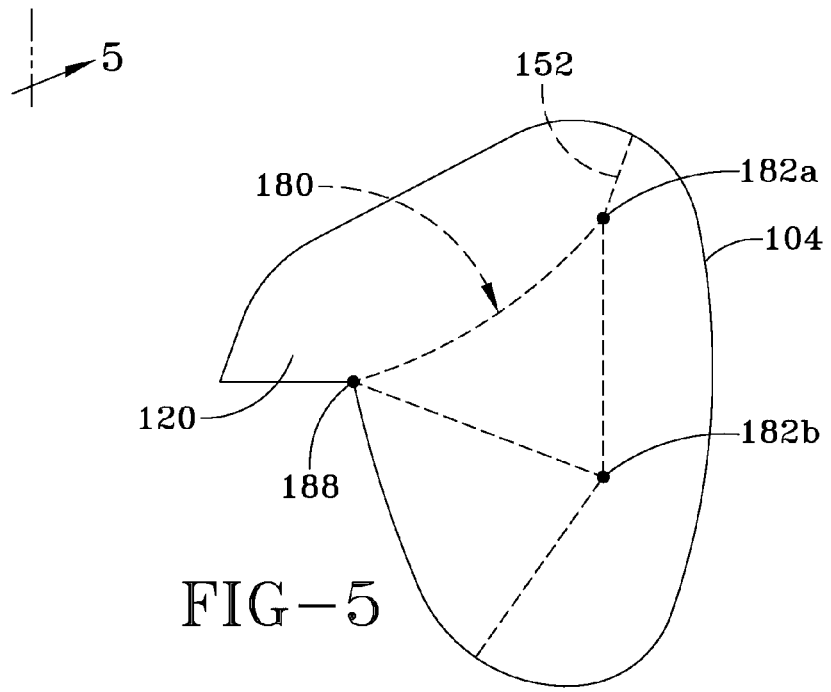
FIG. 5 is a side plan view illustrating one of the side panels of the air bag in FIG. 3, as well as a center panel shown by dashed lines and tether shown in dotted and dashed line.
Figure 3A:
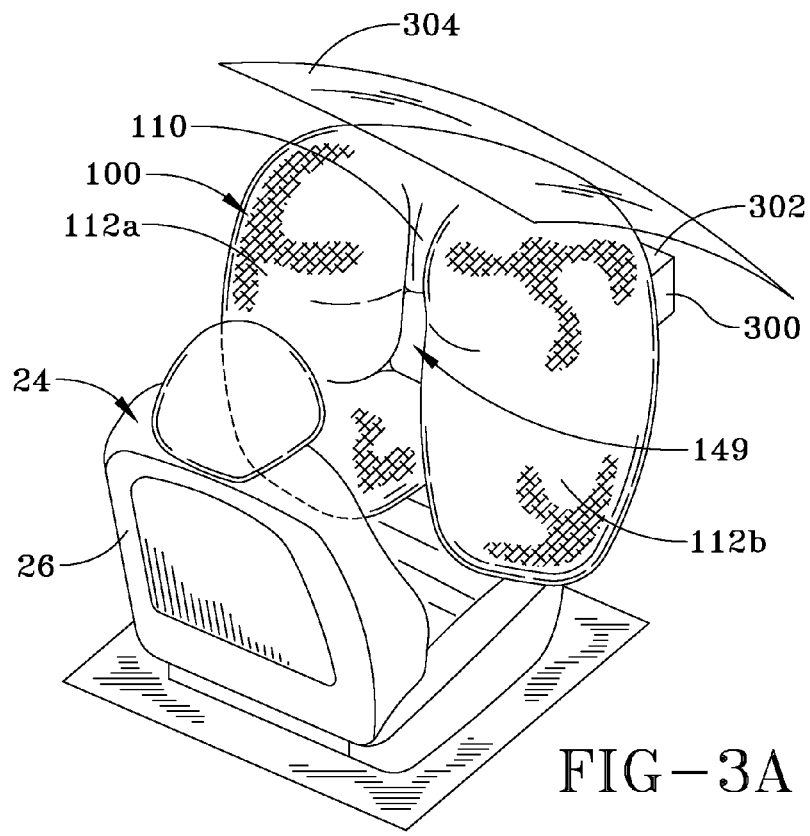
FIG. 3a is an isometric view of an inflated air bag shown in relation to a vehicle's windshield and seat.

Reference is again made to FIGS. 3, 4 and 5, which illustrate the placement and location of the tether panel 180 in relation to the other panels forming the air bag 100. FIG. 4 illustrates, in regard to panel 160, dotted lines 186a and 186b, the connection line or seam at which edges 182a and 182b are respectively sewn to the groove center panel 160. Further, FIG. 4 also illustrates another dotted line 188 to which the intermediate line or section 184 of the tether panel 180 is sewn. Upon inflation of the air bag, the tether panel 180 is stressed, thereby preventing the center groove panel 160 (or in general the center of the structure 149) from moving outwardly relative to the lobes 112a and 112b, thereby creating the groove or space 110 between these lobes 112a and 112b and permitting the lobes 112a and 112b to inflate as shown in FIGS. 3 and 3a. FIG. 3a shows the typical inflated shape of air bag 100. In FIG. 3a, the air bag 100 is configured as part of a top-mount air bag module 300. Module 300 is placed, in a known manner, at the top surface of an instrument panel 302 shown in phantom line. Upon inflation of the air bag the module's cover is forced open and the air bag inflates upwardly toward the windshield 304 and forwardly toward the seated occupant. In FIG. 3a the occupant is not shown, however, the vehicle 24 is shown. The various lobes 112a and 112b are clearly shown.

Figure 7:
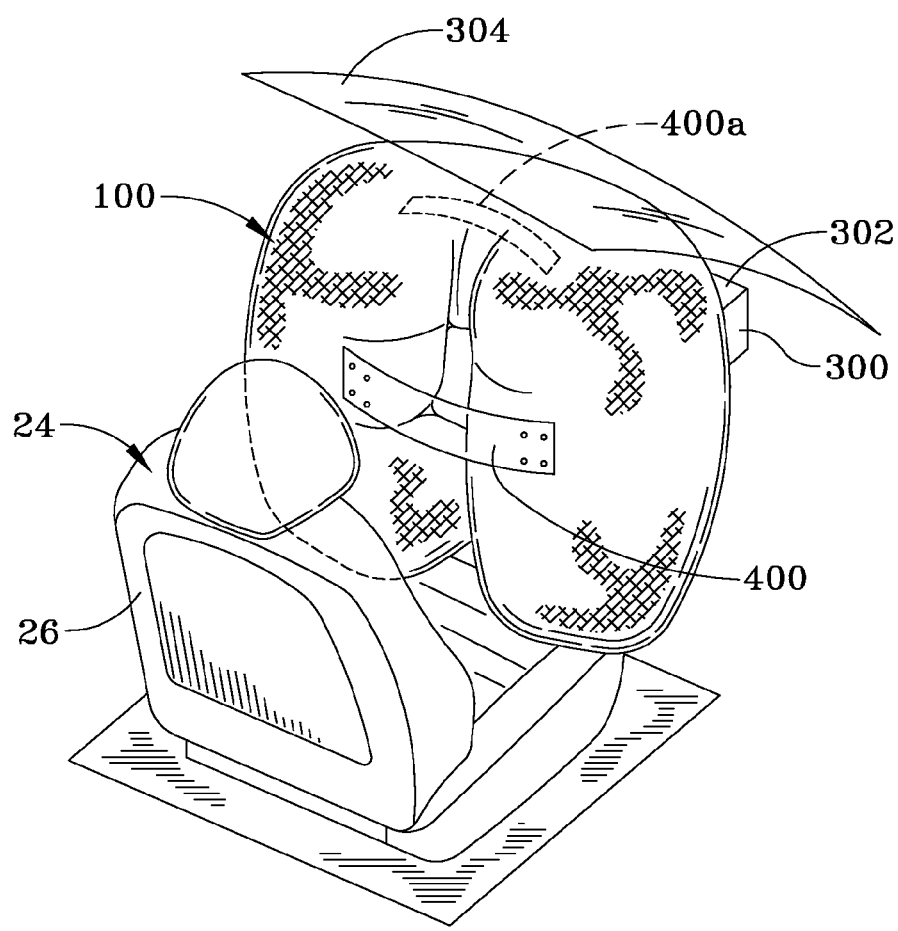
FIG. 7 shows a further alternative of the invention.

As the air bag 100 initially deploys outwardly during the very dynamic event of the inflation, the spacing between the inflating lobes 112a and 112b might increase in size greater than the steady state spacing. FIG. 7 shows a patch 400, preferably made of the same material as the air bag, located on the face portion 103 of the main panel 102, which joins the two lobes 112a and 112b and which serves to limit the spacing of the lobes during and after inflation. The material chosen for the patch, instead of being air bag material, could for example be a length of woven seat belt material or any material capable of absorbing a tensile load. In one embodiment a patch 400a joins the tops of both lobes and is shown in phantom line and with the air bag inflated will in general extend horizontally between the lobes. In the preferred embodiment patch 400 joins opposing middle parts of the lobes. In general the lower patch 400 is chosen to be below the chest of a 6-year-old occupant when seated in an OOP position with its chest on the cover of the air bag module, as well as below the neck of the normally seated $50^{th}$ percentile adult occupant.

Many changes and modifications in the above-described embodiment of the invention can, of course, be carried out without departing from the scope thereof. Accordingly, that scope is intended to be limited only by the scope of the appended claims.

The invention claimed is:

1. An air bag (100) comprising:
 a main (face) panel (102) having an upper neck portion (124), lower neck portion (124) and cushion portion (126), the panel having:
  a left edge (134) and a right edge (134a);
  a left outside panel (104a) having a neck portion (120) and cushion portion (122) secured along the left edge of the main panel,
  a right outside panel (104b) having a neck portion (120) and cushion portion (122) secured along the right outside edge of the main panel;
  the main panel (102) having a face panel portion (103) that is configured to interact with an occupant (22) to be protected, the face panel portion having an opening (130) therein; the opening having an edge (140*a–d*);

recess means secured about the edge of the opening configured to form an inwardly extending recess or pocket (110) in the face panel, the recess means having a left recess (or groove) panel portion (150) secured to a left portion of the edge (140*d*) of the face panel opening (130), and a right recess panel portion (152) secured to the right portion (140*c*) of the edge of the face panel portion; the recess means further including a center recess panel portion (160) secured to each of the right and left recess panel portions and to the main panel;

a tether (180), secured to the central portion of the recess means, for limiting outward movement of the central portion of the recess means to cause the air bag when inflated to have an inflatable first lobe (112*a*) formed by one side of the recess means and by an inflatable second lobe (112*b*) on another side of the recess means and the face panel.

2. An air bag (100) comprising:

a main panel (102) having face panel portion (103) configured to face an occupant when the air bag is inflated, the main panel in the vicinity of the face panel portion including an opening (130, 130*a*, 130*b*), the opening having an edge (140);

a cup-shaped structure (150, 152, 160) of material is fitted within the opening and sewn or otherwise secured to the edge (140) of the main panel opening (130), the cup-shaped structure is located within the air bag below the exterior surface of the main panel;

a tether (80) anchored at one end and having a second end is secured to a portion of the cup-shaped structure, the length of the tether configured to prevent the cup-shaped structure from moving beyond the exterior surface of the main panel, the cup-shaped structure and remaining parts of the air bag forming opposing lobes (112*a*, 112*b*) upon inflation, wherein the cup-shaped structure forms a groove or depression (110) between the lobes.

3. The air bag according to claim 2 wherein the opening is one of rectangular, oval and hybrid shape.

4. The air bag according to claim 3 wherein the hybrid shape includes a rectangular upper portion and a lower portion that is generally triangular or trapezoidal in shape.

5. The air bag according to claim 2 further including a patch or tether means joining each opposing lobe for limiting the spacing between the lobes to generally that of the length of the patch or tether means.

* * * * *